United States Patent [19]

Rutman

[11] Patent Number: 5,313,586
[45] Date of Patent: May 17, 1994

[54] CO-PROCESSOR DE-COUPLING BUS STRUCTURE

[75] Inventor: Serge Rutman, Boulder Creek, Calif.

[73] Assignee: Intel Corporation, Santa Clara, Calif.

[21] Appl. No.: 847,190

[22] Filed: Mar. 6, 1992

[51] Int. Cl.$^5$ .............................................. G06F 13/00
[52] U.S. Cl. ..................................... 395/275; 395/425
[58] Field of Search ................ 395/200, 275, 425, 250

[56] References Cited

U.S. PATENT DOCUMENTS

4,937,781 6/1990 Lee et al. ............................ 364/900

Primary Examiner—Robert L. Richardson
Attorney, Agent, or Firm—Blakely, Sokoloff, Taylor & Zafman

[57] ABSTRACT

A special type of random access memory referred to as video random access memory (VRAM) is used through to provide multiple access to the memory in a timely manner. The VRAM is characterized by a random access port which enables random accessing to the memory array and a serial port comprising a shift register for outputting a large group of bits of data, such as pixels representative of a scan line of a video image, which are rapidly output by the memory. In the present invention, the VRAM is utilized in a different manner to provide more efficient use of memory without degradation in system performance. The VRAM provides for communications between processors as well as the memory utilized by the coprocessor for storage of code and data. Communications between processors is performed through the serial port; therefore, data is communicated via blocks of data transfers minimizing the frequency of access to the memory array. The co-processor, which utilizes the memory for processing and code storage, communicates with the memory through the random access port in order for the co-processor to perform its functions in a timely manner. The co-processor will only be interrupted in its access of the memory when it is determined that blocks of data are to be transferred into the or out of the memory via the serial port.

13 Claims, 5 Drawing Sheets

CO-PROCESSOR DE-COUPLING BUS STRUCTURE

BACKGROUND OF THE INVENTION

1. Field of the Invention

The method and apparatus of the present invention is directed to a co-processor de-coupling bus for communications between processors.

2. Art Background

To increase the efficiency of a system, it is quite common to provide multiple or co-processors in addition to a main processor and off-load predetermined functions or computations to the co-processors in order to decrease the processing overhead of the main processor. These co-processors are often specialized for a particular task or type of task. For example, math co-processors and graphics co-processors are widely used. The co-processor typically functions as a slave to the master or main CPU. Communications between the co-processors are achieved through a bus, shared memory or a combination of the two.

Figure 1:
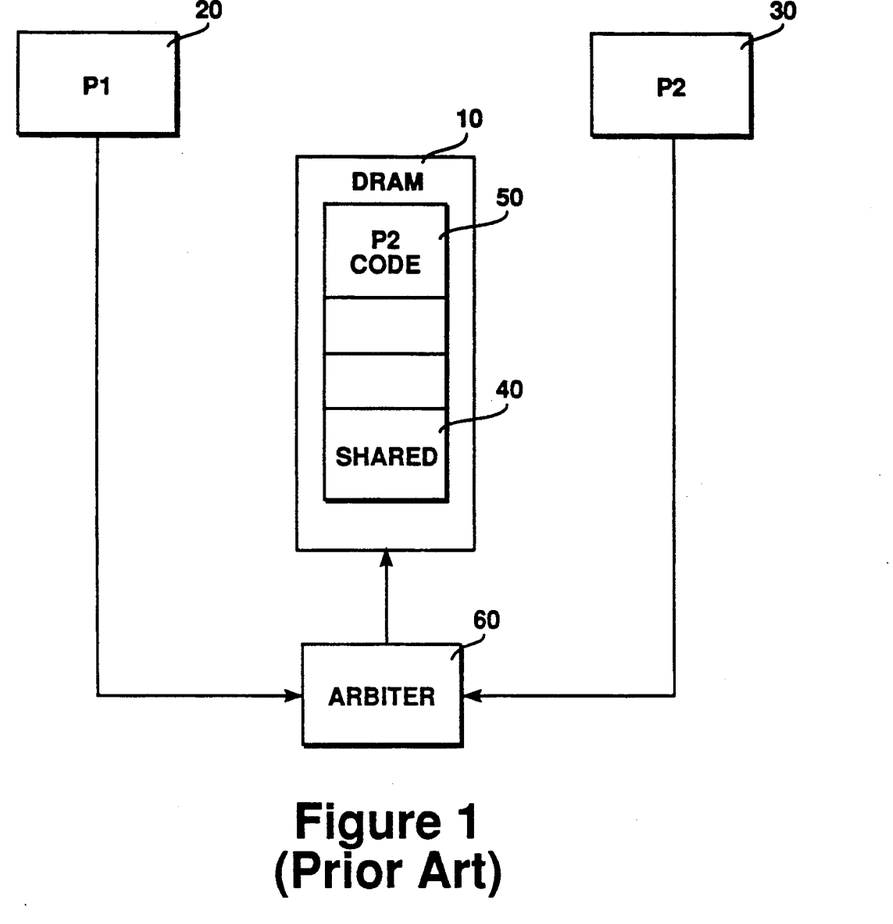
FIG. 1 is a prior art representation of a memory and communications structure between co-processors.

Typically, a separate shared memory is provided for communication of data and instructions between processors. A polling and/or interrupt mechanism is provided in each processor such that each processor knows when instructions and/or data is placed in the shared memory to be accessed by the processor. To save on space and achieve the greatest memory utilization, a single memory such as a dynamic random access memory (DRAM) is used to provide memory for storage of code and data utilized by the co-processor to perform its tasks. The memory functions as the shared memory utilized for communications between the host processor and co-processor. For example, as shown in FIG. 1, DRAM 10 is used for storing data communicated between the main processor 20 and co-processor 30 via a shared memory 40 as well as for storing the code and data utilized by co-processor 30.

As the co-processor 30 is using the memory for storage of code to be executed by the co-processor as well as storage of data to perform the functions, the co-processor will be accessing the memory quite frequently. However, while the co-processor 30 is accessing the DRAM 10 to retrieve code or data 50, the main processor 20 is attempting to also access the DRAM 10 in order to communicate information to the co-processor 30 or retrieve information from the co-processor 30 through the shared memory 40. Thus, an arbitration mechanism 60 is required to determine which access will be permitted as only one access to the physical DRAM chip may be performed at any time.

However, both processors are slowed down measurably due to the inefficient utilization of the DRAM subsystem. For example, it is likely that the physical locations of memory accessed by the main processor and co-processor are far apart in the address space of the memory. The accesses by the main processor and co-processor are therefore likely to result in a large number of "far" cycles. A far cycle occurs when the page mode of the memory subsystem cannot be used. Thus, the number of far accesses to the memory array by both processors is increased.

In order to gain the system performance benefit from the use of a co-processor, the time required for communicating instructions and data from the main processor 20 to the co-processor 30, executing the instruction by the co-processor 30 and communicating the results of the execution to the main processor 20 must be less than the time required for the main processor itself to execute the instructions. Therefore it is quite important that the communications are performed as efficiently as possible with minimal effect on the performance of the co-processor 30.

SUMMARY OF THE INVENTION

It is therefore an object of the present invention to provide a method and apparatus for de-coupling communications between the main processor and co-processor to minimize accesses to memory and increase the efficiency of the co-processor.

It is an object of the present invention to provide a memory architecture which enables low latency access by the main processor and the co-processor for communication as well as access to co-processor code and data by the co-processor located in the memory array without degradation in system performance.

A special type of random access memory referred to as video random access memory (VRAM) is used through to provide multiple access to the memory in a timely manner. The VRAM is characterized by a random access port which enables random accessing to the memory array and a serial port comprising a shift register for outputting a large group of bits of data, such as pixels representative of a scan line of a video image, which are rapidly output by the memory. In the present invention, the VRAM is utilized in a different manner to provide more efficient use of memory without degradation in system performance. The VRAM provides for communications between processors as well as the memory utilized by the co-processor for storage of code and data. Communications between processors is performed through the serial port; therefore, data is communicated via blocks of data transfers minimizing the frequency of access to the memory array. The co-processor, which utilizes the memory for processing and code storage, communicates with the memory through the random access port in order for the co-processor to perform its functions in a timely manner. The co-processor will only be interrupted in its access of the memory when it is determined that blocks of data are to be transferred to the shift register from the memory array or to the memory array from the shift register.

BRIEF DESCRIPTION OF THE DRAWINGS

The objects features and advantages of the present invention will be apparent to one skilled in the art from the filing detailed description in which.

DETAILED DESCRIPTION OF THE INVENTION

In the following description for purposes of explanation, specific memories, organizations, architectures, data rates, etc. are set forth in order to provide a thorough understanding of the present invention. However, it will be apparent to one skilled in the art that the present invention may be practiced without the specific details. In other instances, well known circuits are shown in block diagram form in order not to obscure the present invention unnecessarily.

In the present invention, a video random access memory (VRAM) is used to de-couple co-processor communication to permit the co-processor to access the memory in a timely, low latency manner without frequent interruption due to communication between processors. Instructions and data communicated between co-processors are communicated through a bus and a shared memory which is a predetermined portion of the VRAM. The frequency of communications between processors is high, but the data and instructions communicated typically do not require immediate communication. The present invention takes advantage of the characteristics of most communications between co-processors and utilizes the serial port of the VRAM as the communication port for the main processor. Thus, data and instructions communicated to and from the shared memory are input through the serial port which functions to de-couple the bus by temporarily storing the data in a serial port register until the register is full or otherwise designated to transfer. When the data is transferred, it is transferred together to minimize the amount of time for access. Data/instructions may be transferred from the shift register to the memory when the shift register is full or when otherwise instructed by the processor. For example, data/instructions may be transferred from the shift register to memory when a predetermined instruction/data is encountered, when a predetermined amount of time has elapsed or after a predetermined number of instructions have been transferred into the shift register.

Figure 2:
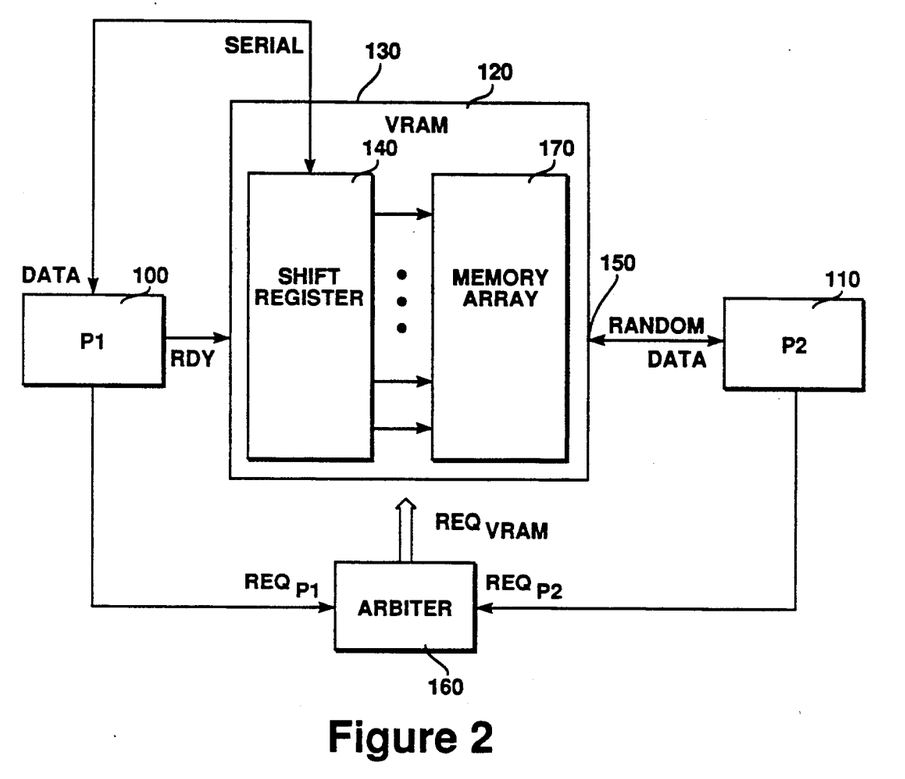
FIG. 2 is a block diagram representation of a preferred embodiment of the present invention

A preferred embodiment of the system of the present invention is depicted by the block diagram of FIG. 2. The main processor 100, such as a CPU, and a co-processor 110, such as a math co-processor, are coupled to a VRAM 120. The VRAM is utilized for code and data storage for the co-processor or slave processor 110 and for communication between processor 100 and 110. Communications from or to the main processor 100 is achieved through serial port 130. In a VRAM, the serial port 130 is coupled to a shift register 140. Data received from host processor 100 is serially shifted into the shift register 140. Subsequently, the data loaded into the shift register 140 is loaded in parallel into the memory array. Thus, if a number of communications, for example, ten, are received from the host processor 100, only a single access and not ten, is performed. The co-processor 110, which may frequently access the memory for code and data through random access port will gain almost free access to the memory; arbitration is only required when a block transfer from the shift register is required.

The resultant effect is the use of a single memory to save on chip space and the minimization of memory access by the main processor for communications thereby freeing the same memory for frequent access by the slave processor for code and data. Arbitration for access to the memory by the main processor and co-processor 100,110, is performed by an arbiter 160 only when data is to be transferred from the shift register 140 into the memory array 170. The ports may operate in a unidirectional or bidirectional manner. If the ports operate in a unidirectional manner, a system comprising multiple symmetric VRAMs can be employed to provide the flow of data into and out of the processors and devices. For example, data from the main processor to be written to memory for communication to the co-processor is written into a first memory device and data to be written to main memory is transferred to main memory through a second memory device.

Figure 3:
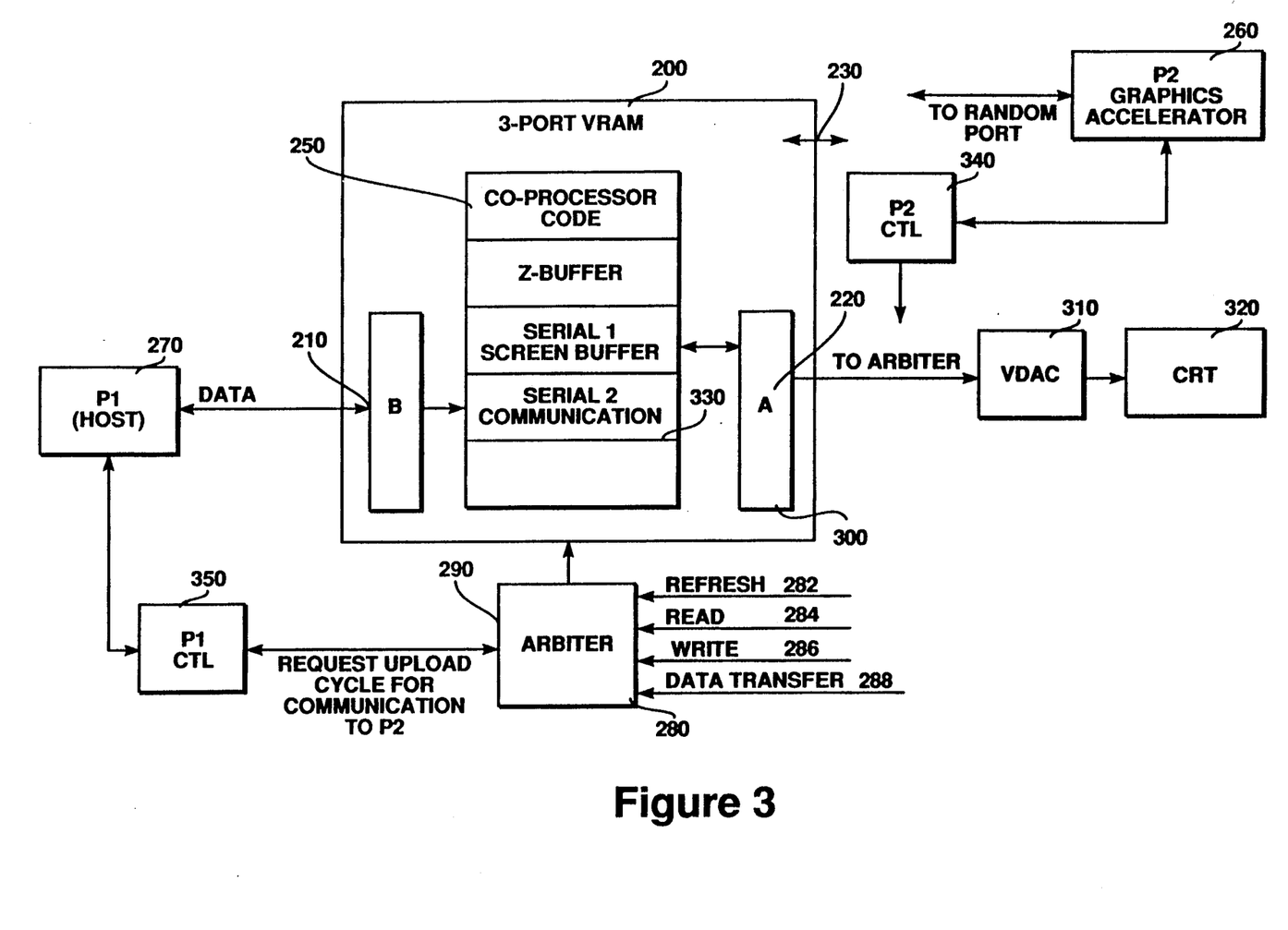
FIG. 3 is a block diagram representation of an alternate preferred embodiment of the present invention in which the memory provides essential functionality without degradation in overall processing speed due to multiple memory access ports.

FIG. 3 illustrates how the process can be expanded to enable a single memory to provide maximum functionally not previously performed while maintaining system efficiency. Referring to FIG. 3, a 3 port VRAM 200, is utilized as the multiple function memory. Such VRAMs are found in the art, such as MT43C4257/8, a triple port DRAM marketed by Micron Technology, Inc., Boise, Id. The 3 point VRAM consists of two serial ports 210, 220 a random access port 230, and memory array 250. The co-processor 260 in this example is a graphics accelerator, which performs predetermined graphics functions as instructed by the main processor 270. Arbitration is performed to determine which port has access to the memory array 258 at any time. Illustrative signal requests are shown such as refresh 282, read 284, write 286, and video data transfer 288, as well as the communication requests to/from the main processor 290.

The random access port 230 is utilized by the graphics accelerator 260 to read and write data and code during the processing of instructions. One such function is the coding of the z-buffer used frequency during the generation of graphic images. The z-buffer may be accessed either through the random access port 230 or one of the serial ports 210, 220. This can be determined by an external controller, such as P2 CTL 340 which generates various memory control signals for memory access by the graphics accelerator 260. For example, if random access read and write operations to the z-buffer are to be performed by the graphics accelerator, the controller 340, issues the control signals to be performed through the random access port. If a block operation is to be performed, such as a fast clear of the z-buffer, the controller 340 issues control signals to cause clear bits to be loaded into a row of the z buffer via the random port of the VRAM. The controller then issues control signals to read that row into the shift register 300 of the serial port 220 and subsequently repeatedly transfer the cleared shift register to the remaining rows of the z-buffer portion of the memory array 250 to perform the clear function.

The frame buffer can also be included in this same memory array 250. The frame buffer is accessed through the first serial port 220, such that blocks of data representative of the frame buffer can be transferred to the register to 300 and subsequently output to the video digital to analog converter (VDAC) 310 for generation of the video display on a graphics device such as the CRT 320. By using the serial port, rows of video data stored in the frame buffer can quickly be read from the memory 250 with minimal interference with the graphics accelerator 260 accesses to the memory for code and data.

As described earlier, communications between the graphics accelerator 260 and host 270 are achieved through a shared section of the memory. The main processor, 330, performs memory operations through the second serial port 210 in the manner described earlier which minimizes the frequency of memory accesses. Also shown in FIG. 3 are controllers 310, 350 for the processors 270, 260. The controllers perform, among other things, the function of generating requests for access to the memory array to the arbiter 280. This function, depicted by blocks 310, 350, may be incorporated into the processor 270, 260, or constructed as a separate controller. Thus, by using the architecture of the present invention, the single memory array can function to provide not only memory for communications between co-processors but also memory to function as a frame buffer, a z-buffer and memory for code and data for functioning of the co-processor with little or no noticeable degradation in system processing performance.

Figure 4:
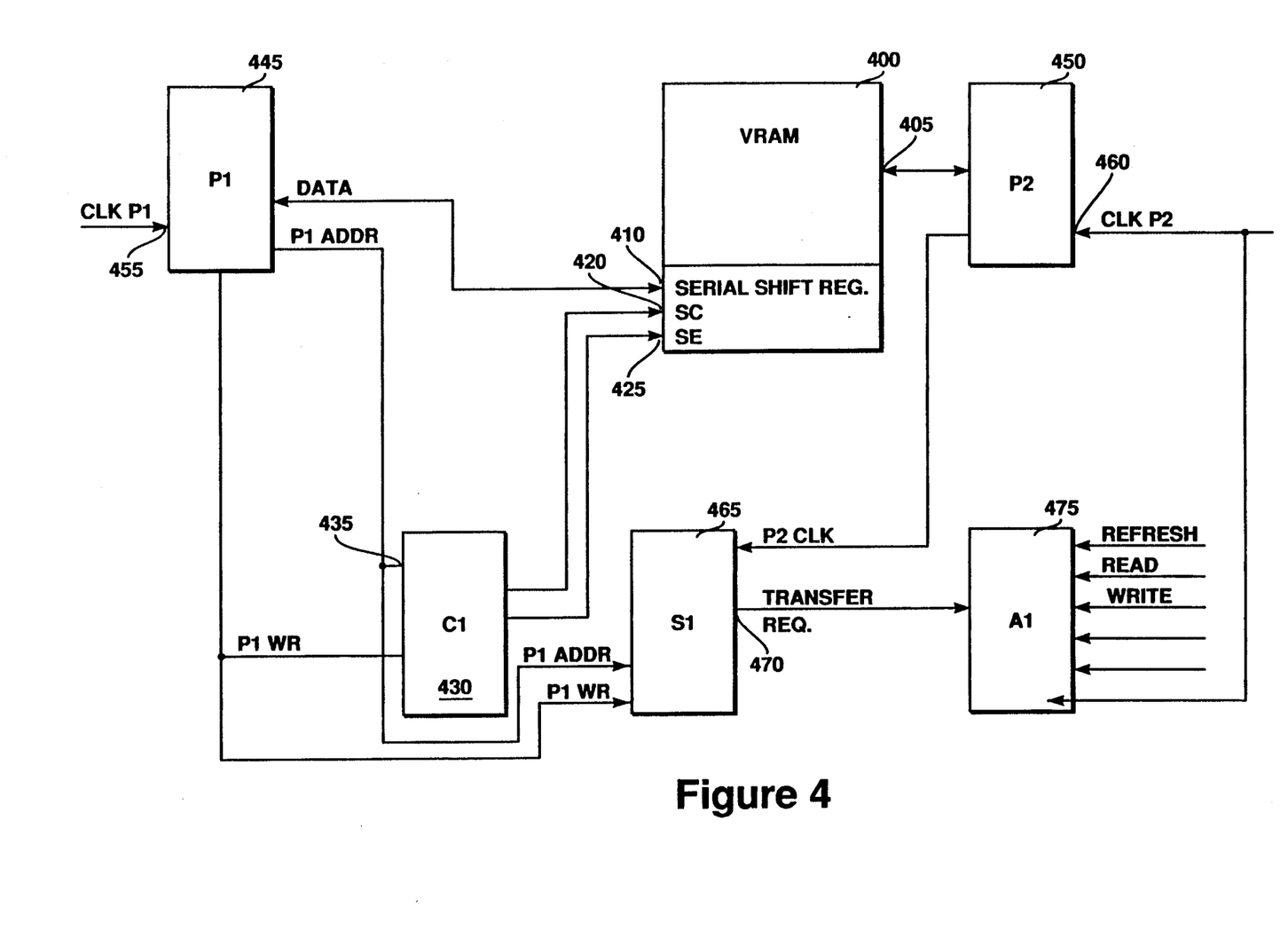
FIG. 4 is a block diagram representation of an alternate preferred embodiment of the present invention in which the number of synchronization events between two processors operating at different clock rates is reduced.

An alternate embodiment of the de-coupler bus of the present invention is illustrated by FIG. 4. In this embodiment, the de-coupler bus reduces the number of synchronization events between the main processor and co-processor when the processors operate at different clocks. The VRAM 400 has a random port 405 and serial port 410. The serial port is coupled to the shift register 415. Data is clocked into the shift register 415 according to the serial clock (sc) and serial enable (se) signals 420, 425. These signals are generated by the serial clock, serial enable generator C1 430 according to the address input 435 (P1addr) and write signal input 440 (P1wr) generated by the main processor.

The main processor P1 445 and P2, the co-processor 450 operate on different clocks, respectively, CLKP1 455 and CLKP2 460. Communications between processors would have to be synchronized for each such transfer of information. Through the de-coupling bus of the present invention, the amount of synchronization required is minimized. Information is serially shifted into the serial shift register 415 without the need to synchronize to the P2 clock 460. Synchronization is only required when a request is issued to transfer the block of data located in the shift register 415. A synchronizer 465 generates a transfer request signal 470 issued to the arbiter 475 which arbitrates access to the VRAM 400. The synchronizer receives as input the address and write signal and the clock, P2 clock, of the co-processor. The transfer request signal 470 issued from the decoded P1 address and P1WR signal is issued in synch with the P2 clock. Thus, the need to synchronize each transfer of data from P1 to P2 is eliminated.

Although not described in detail herein, the reverse function similarly can be provided. In particular, the transfer can be performed between P2 and P1.

Figure 5:
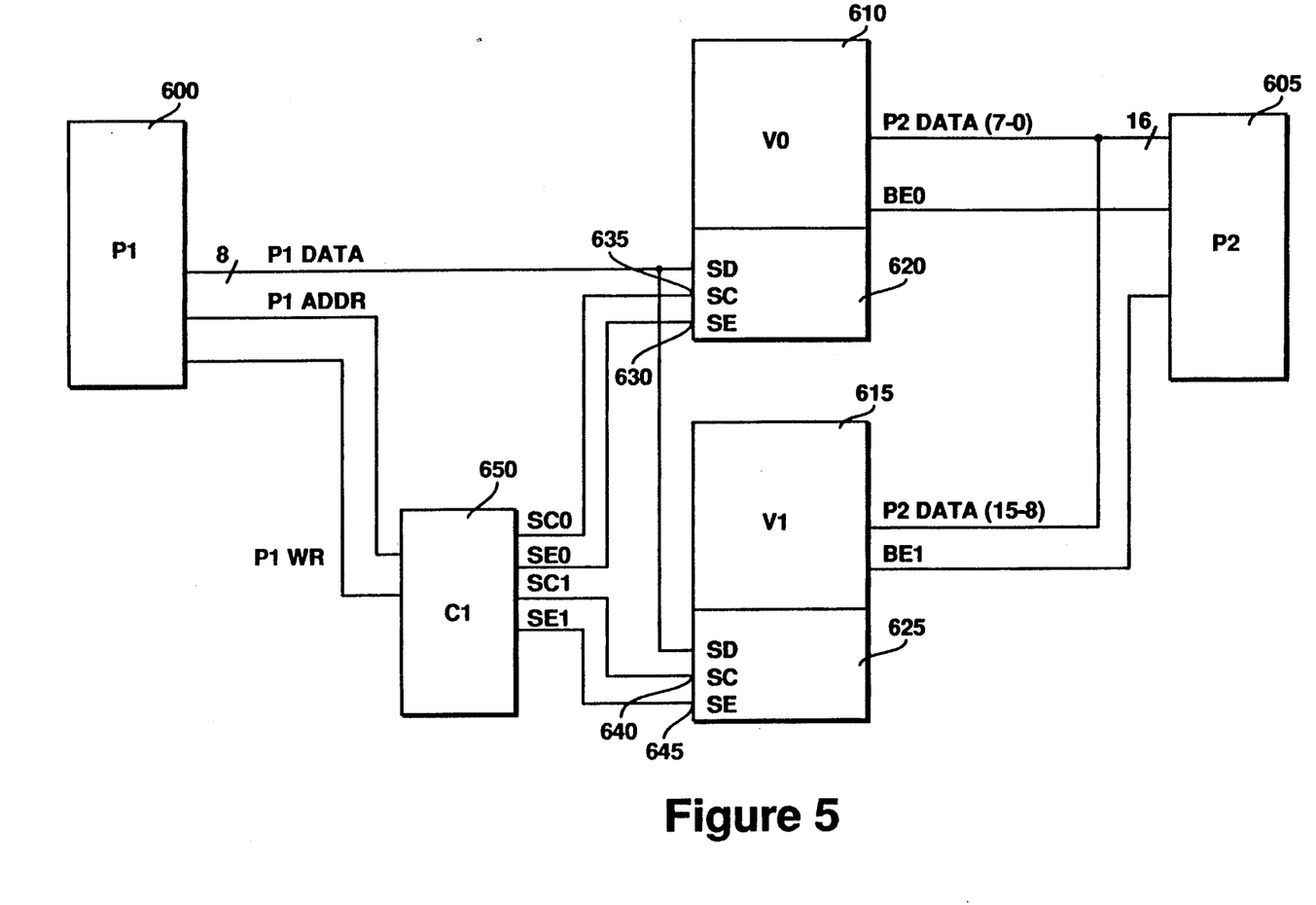
FIG. 5 is a block diagram representation of an alternate preferred embodiment of the present invention in which the co-processor de-coupling bus is utilized to connect processors employing different bus sizes.

The co-processor de-coupling bus of the present invention may also be utilized to match co-processors that employ different bus sizes. This is illustrated with reference to FIG. 5. P1 600 operates on a bus size of 8 bits. Co-processor P2 605 operates on a bus width of 16 bits. As can be seen by the following discussion, this concept may be expanded to match bus widths of varying widths, for example, 16 to 32 bits, 16 to 64 bits, 32 to 64 bits. It is also obvious to one skilled in the art from reading the description that similar circuitry may be employed for varying bus sizes as well as bi-directional functionality. Referring back to FIG. 5, the block diagram shown illustrates the de-coupling bus of the present invention and the transfer of data from P1 to P2. Two VRAMs are employed 610, 615. The input to the shift register 620, 625 of the VRAMs are shorted together to receive the 8 bits of data from the main processor 600. However, this data will only be shifted into a single shift register according to the clock and enable signals provided, respectively 630, 635, 640, 645. The controller C1 650 generates four control signals SC0, SE0, SC1, SE1, which respectively correspond to the clock and enable signals for the VRAM 0 610 and clock and enable signals for the VRAM 1 615. In this illustration, the controller 650 generates serial clocks and enables to operate the shift register based on the least significant bit of the address. Data is subsequently transferred from the shift register to the memory and to and out of the memory via the 16 bit bus size coupled to the co-processor 605. Thus, the function of much buses of differing sizes is easily solved by using simple control signals in conjunction with the decoupling bus of the present invention.

While the invention has been described in conjunction with the preferred embodiments, it is evident that numerous alternatives, modifications, variations and uses will be apparent to those skilled in the art in light of the foregoing description.

What is claimed is:

1. In a computer system comprising a main processor and a co-processor, a memory system for communication of information between the main processor and co-processor and for storage of co-processor code and data for access by the coprocessor, said memory system comprising:
    a dual port random access memory (RAM) for storing communication of information between the main processor and co-processor and for storing code and data accessed by the co-processor, said RAM comprising:
    a first input/output (I/O) random access port to read and write data on a random access basis, and
    a first serial I/O port coupled to a shift register to serially shift in data to the shift register and transfer the serially shifted in data in blocks to the memory;
    a first coupling means for coupling the main processor to the serial I/O port, said main processor communicating data to the memory to the serial I/O port through the shift register in blocks of data such that data communicated are transferred in blocks between the shift register and the memory at a frequency less than a frequency data is communicated between the main processor and the serial port;
    a second coupling means for coupling the co-processor to the random access port, said co-processor data randomly accessing code and data on an as-needed basis;
    whereby a single memory is used to provide memory support to the co-processor as well as enable the communication of information between the main processor and co-processor, such that the co-processor has the minimal of interruption of access to the memory for code and data.

2. The memory system as set forth in claim 1, further comprising a block transfer control means coupled to the shift register to indicate when the communication information serially shifted into the shift register is to be transferred to the memory.

3. The memory system as set forth in claim 2, wherein the block transfer control means causes the communication information in the shift register to be transferred after a predetermined time has elapsed.

4. The memory system as set forth in claim 2, wherein the block transfer control means causes the communication information in the shift register to be transferred after the shift register is full.

5. The memory system as set forth in claim 2, wherein the block transfer control means causes the communication information in the shift register to be transferred after a communication requiring immediate transmission is detected.

6. The memory system as set forth in claim 1, further comprising an arbiter, said arbiter determining the processor which accesses the memory.

7. The memory system as set forth in claim 1, wherein the main processor and co-processor operate at different clocks, said memory system reducing the number of synchronization events required to transfer data between the main processor and co-processor.

8. The memory system as set forth in claim 1, wherein the main processor communicates data across a bus of a first predetermined size and said processor communicates data across the bus of a second predetermined size, said first predetermined size being an increment of $2^n$ of the first predetermined bus size.

9. In a computer system comprising a main processor and a co-processor, a memory system for communication of information between the main processor and co-processor and for storage of co-processor code and data for access by the coprocessor, said memory system comprising:
- a dual port random access memory (RAM) for storing communication of information between the main processor and co-processor and for storing code and data accessed by the co-processor, said RAM comprising:
  - a first input/output (I/O) random access port to read and write data on a random access basis, and
  - a first serial I/O port coupled to a shift register to serially shift in data to the shift register and transfer the serially shifted in data in blocks to the memory;
- a first coupling means for coupling the main processor to the serial I/O port, said main processor communicating data to the memory through the serial I/O port through the shift register in blocks of data;
- a second coupling means for coupling the co-processor to the random access port, said co-processor data randomly accessing code and data on an as-needed basis;
- an arbitration means for arbitrating access to the memory through the random access and serial ports;
- a serial port control means for controlling the frequency of transferring data from the shift register to the memory, said serial port control means decreasing the frequency the communicated information are transferred between the shift register and the memory and the frequency access to the memory is arbitrated;
whereby a single memory is used to provide memory support to the co-processor as well as enable the communication of information between the main processor and co-processor, and the information communicated are transferred between the shift register and memory in blocks at a frequency less than a frequency information si communicated between the main processor and the serial port such that the co-processor has the minimal of interruption of access to the memory for code and data such that the frequency of efficient near cycles are used for the accesses.

10. In a computer system comprising a main processor and a co-processor, a method for utilization of a memory system for communication of information between the main processor and co-processor and for storage of co-processor code and data for access by the coprocessor, said method comprising the steps of:
- providing a dual port random access memory (RAM) for storing information communicated between the main processor and co-processor and for storing code and data accessed by the co-processor said RAM comprising a first input/output (I/O) random access port to read and write data on a random access basis, and a first serial I/O port coupled to a shift register to serially shift data between the I/O port and the shift register and transfer the serially shifted in data in blocks between the shift register and the memory;
- coupling the main processor to the serial I/O port;
- coupling the co-processor to the random access port,
- arbitrating access to the memory through the random access and serial ports;
- said co-processor randomly accessing code and data in the memory through the random access port on an as-needed basis;
- said main processor accessing the memory through the serial I/O port;
- shifting serially information between the main processor and the shift register;
- transferring a block of information between the shift register and the memory, said block transferred at a frequency less than a frequency information is shifted between the shift register and the main processor;
whereby a single memory is used to provide memory support to the co-processor as well as enable the communication of information between the main processor and co-processor, such that the co-processor has the minimal of interruption of access to the memory for code and data and efficient near cycles are frequently used to access the memory.

11. In a computer system comprising a main processor and a graphics co-processor, a memory system for communication of information between the main processor and co-processor and for storage of co-processor code and data for access by the coprocessor, said memory system, comprising:
- a triple port random access memory (RAM) for storing information communicated between the main processor and graphics co-processor, for storing code and data accessed by the graphics co-processor, and for storing a frame buffer an a z buffer, said RAM comprising,
  - a first input/output (I/O) random access port to read and write data on a random access basis,
  - a first serial I/O port coupled to a shift register to serially shift in data to the shift register and transfer the serially shifted in data in blocks to the memory, and
  - a second serial I/O port coupled to a shift register to transfer data in blocks from the memory and serially shift the data out through the I/O port;

a first coupling means for coupling the main processor to the serial I/O port, said main processor communicating data to the memory to the first serial I/O port through the shift register in blocks of data such that information communicated are transferred in blocks between the shift register and the memory at a frequency less than a frequency data is communicated between the main processor and the serial port;

a second coupling means for coupling the co-processor to the random access port, said co-processor data randomly accessing code, data, the z buffer and the frame buffer on an as-needed basis;

a third coupling means for coupling a video digital-to-analog converter (VDAC) to the second serial I/O port, said VDAC receiving pixel data from the frame buffer representative of an image from the memory and generating analog signals for displaying the image on a display device;

an arbitration means for arbitrating access to the memory through the random access and serial ports;

a serial port control means for controlling the frequency of transferring data from the shift register to the memory, said serial port control means decreasing the frequency the information communicated between the main processor and the shift register are transferred between the shift register and the memory thereby decreasing a frequency that access to the memory is arbitrated;

whereby a single memory is used to support a frame buffer, a z buffer, the graphics co-processor code and data as well as communications between the main processor and co-processor, pixel data is transferred from the memory in blocks and the communications are transferred to memory in blocks at a frequency less than the frequency communications are transmitted through the serial port such that the co-processor will have the minimal of interruption of access to the memory for code and data.

12. In a computer system comprising a main processor operating at a first clock and a co-processor operating at a second clock, a de-coupling bus for the transfer of information between the main processor and co-processor comprising:

a dual port random access memory (RAM) for storing the information to be transferred between the main processor and co-processor comprising, a first input/output (I/O) random access port to read and write data on a random access basis, a first serial I/O port coupled to a shift register to serially shift in data to the shift register and transfer the shifted data in blocks to the memory;

a first coupling means for coupling the main processor to the serial I/O port, said data communicated between the main processor and the shift register through the serial I/O port at a clock derived from the first clock, said data transferred between the shift register and the memory in blocks at a clock derived from the second clock;

a second coupling means for coupling the co-processor to the random access port, said co-processor randomly accessing data form the memory at a clock derived from the second clock;

wherein the co-processor de-coupling bus reduces the number of synchronization events required to transfer data between the main processor and co-processor when operating at different clocks by requiring synchronization events only when data is transferred between the shift register and the memory.

13. In a computer system comprising a first processor and a second processor, a de-coupling bus for transferring data between the first processor and second processor, said first processor transferring data across a first bus having a first bus width of a first predetermined number of bits and said second processor transferring data across a second bus having a second bus width of a second predetermined number of bits incrementally greater than the first bus width by an incremental value;

a plurality of dual port random access memories (RAM) for storing data to be transferred between the first processor and second processor, the number of dual ported RAMs being at least greater than the incremental value between the bus sizes;

each of said RAM comprising, a first input output (I/O) random access port to the read and write data on a random access data basis and first serial I/O port coupled to a shirt register to serially shift in data to the shift register and transfer the serially shifted in data in blocks to the memory;

first coupling means to couple the first processor to each of the shift registers of the serial I/O ports of the plurality of dual port RAMs, said first processor data transferred between the memory and the shift register such that data are transferred in blocks to the memory; said data transferred between memory only when the serial enable line is active;

second coupling means for coupling the second processor to the random access port of each of the RAMs, the number of bits of the second bus coupled to each random access port equal to the first predetermined number of bits such that portions of the second bus are distributively coupled to different RAMs, said second processor data are transferred between the second processor and memory on a random access basis;

whereby a plurality of dual port RAMs support processors communicating data across busses of different bus sizes.

* * * * *

UNITED STATES PATENT AND TRADEMARK OFFICE
CERTIFICATE OF CORRECTION

PATENT NO. : 5,313,586
DATED : May 17, 1994
INVENTOR(S) : Serge Rutman

It is certified that error appears in the above-indentified patent and that said Letters Patent is hereby corrected as shown below:

Column 8, Line 1,   Delete "si"   Insert -- is --

Column 8, Line 16,  Insert -- , -- between "co-processor" and "said"

Column 8, Line 58,  Delete "an"   Insert -- and --

Column 9, Line 21,  After "and" Insert -- first and second --

Signed and Sealed this

Thirty-first Day of October 1995

Attest:

BRUCE LEHMAN

Attesting Officer

Commissioner of Patents and Trademarks